United States Patent [19]

Huebsch, III

[11] 4,447,548

[45] May 8, 1984

[54] HIGH POROSITY CERAMIC MATERIALS AND METHOD FOR MAKING SAME

[76] Inventor: Monte F. Huebsch, III, 3770 Flora Vista Ave. #2008, Santa Clara, Calif. 95051

[21] Appl. No.: 409,113

[22] Filed: Aug. 18, 1982

[51] Int. Cl.$^3$ ............................................. C04B 21/00
[52] U.S. Cl. ...................................... 501/85; 501/129; 501/133
[58] Field of Search ................. 501/80, 85, , 129, 133, 501/143, 144, 154

[56] References Cited

U.S. PATENT DOCUMENTS 4,118,450 10/1928 Nakamura et al. ................... 501/80

*Primary Examiner*—James Poer
*Attorney, Agent, or Firm*—Paul L. Hickman

[57] ABSTRACT

A method for producing a high porosity ceramic material characterized by the steps of: (1) wetting a finely divided, non-crystalline, amorphous silica with a wetting agent; (2) combining the wetted silica with a ceramic slip to produce a mixture; and (3) removing the majority of the wetting agent to produce a solid, low-density, highly porous bisque. The bisque if preferably partially covered with an impermeable coating, and an aromatic fluid is applied to an exposed surface of the bisque for absorption into the body of the bisque.

9 Claims, No Drawings

HIGH POROSITY CERAMIC MATERIALS AND METHOD FOR MAKING SAME

BACKGROUND OF THE INVENTION

1. Field of the Invention

This invention relates generally to scented materials and more particularly to ceramic type scent carriers.

2. Description of the Prior Art

A great many materials have been used for carrying scents. For example, Carson in U.S. Pat. No. 4,254,179 and Stone in U.S. Pat. No. 4,226,944 both teach processes for impregnating a porous foam product with fragrance. Foams, particularly polyurethane foams, are well adapted as fragrant carriers due to their high porosity and cellular impermeability. Disruption of the cell structure of the foam allows a fragrance to escape through the porous network of the foam.

Another type of scent carrier is taught in U.S. Pat. No. 4,110,261 of Newland which describes a fragrance emitting article having a polymer-petroleum wax composition. Wax based scent carriers differ from foam carriers in that they do not have pores or intersticies which would allow the fragrance to escape. Fragrances are typically released from a waxed based carrier by partially melting it or by scratching its surface.

Yet another approach to scent carriers is described in U.S. Pat. No. 4,293,602 of Coffey. In his patent, Coffey teaches a fragrant ornament consisting of a mixture of natural botanical materials, essential oils, and a fluorocarbon resin binder. The resin binder holds the plant material together and slows the release of the essential oils.

A substantially different approach to scent carrying was taken by Atkinson in U.S. Pat. No. 195,324. In his patent, Atkinson describes a fragrant article made from a porous ceramic soaked in a perfumed oil. The article can be worn as a charm or an ornament such that the perfume is released over a period of time.

Of all of the above cited patents, only Atkinson addresses the problem of applying a scent to a hard, immalleable, and stable material. Obviously, the foam, wax, and resin based scent carriers described above are rather fragile materials and are subject to rapid wear and structural failure. On the other hand, Atkinson's ceramic based scent carrier, if properly fired and cured, can be quite durable and should last many years in normal usage.

Atkinson's article, however, does have certain drawbacks. The rather low absorbtion ability of commercially available ceramic materials means that the articles described by Atkinson cannot hold very much perfume. This, of course, means that his articles will rapidly lose their scent. Furthermore, since commercially available ceramic materials have a moderately high specific gravity of about 1.77, they tend to make rather heavy and clumsy ornaments.

SUMMARY OF THE INVENTION

An object of this invention is to provide a improved scent carrier.

Another object of this invention is to provide a high porosity, low density ceramic material well adapted for carrying scented fluids.

Yet another object of this invention is to provide several methods for producing the low density ceramic material.

A still further object of this invention is to provide a high porosity ceramic material with a very high fluid carrying capacity per unit weight.

Another object of this invention is to provide a ceramic material which has a high fluid carrying capacity per unit volume.

Yet a further object of this invention is to provide a scented ceramic material which will release a fragrance for an extended period of time.

Briefly, a method of the present invention is to (1) wet a finely divided, non-crystalline, amorphous silica with a volatile wetting agent; (2) combine the wetted silica with a commercially prepared ceramic slip to produce a mixture; and (3) remove the majority of the wetting agent from the mixture to produce a solid, low-density, highly porous bisque. A preferred wetting agent is distilled water, which is later removed by firing the mixture in a kiln. Preferably, one to four parts wetted silica are combined with each part of ceramic slip.

Structurally, the scented ceramic material includes a low-density, high porosity bisque made from a mixture of a finely divided, non-crystalline amorphous silica and a ceramic slip, the resulting bisque being saturated with an aromatic fluid. A portion of the surface of the bisque may be glazed to inhibit the evaporative dispersion of the aromatic fluid.

An advantage of this invention is that the bisque produced by the disclosed method has a very high fluid carrying capacity per unit weight and volume. Laboratory tests comparing the fluid capacity per weight of the high porosity bisque versus the fluid carrying capacity per weight of a standard bisque indicates a increase of 514.29% for the present invention.

Another advantage of this invention is that the high porosity bisque has a very low specific gravity, and as such is well suited for wearing as a lightweight ornament.

A still further advantage of this invention is that a given volume of the high porosity bisque will retain an essential scent much longer than a conventional bisque.

These and other objects and advantages of the present invention will no doubt become apparent upon a reading of the following descriptions.

DETAILED DESCRIPTION OF THE PREFERRED EMBODIMENT(S)

The high porosity ceramic material of the present invention includes two essential ingredients, namely (1) a ceramic or porcelain slip; and (2) a finally divided, non-crystalline, amorphous silica.

The primary ingredient of most ceramic and porcelain slips is China clay (Kaolin). China clay is a soft white earth consisting principally of mineral kaolinite, which is a hydrated aluminum silicate ($Al_2O_3 2SiO_2 2H_2O$). In its natural state, however, it invariably occurs with some of the alumina replaced by iron, titanium, and alkalis. Because it was first used in England for the production of Chinaware, it was given the English name China clay. In other countries it is usually called Kaolin.

Porcelain and most other types of ceramics are mixtures of Kaolin and other materials. For example, procelain is made by mixing Kaolin with other materials such as quartz, feldspar, or bone ash. The generic terms "ceramic" and "ceramic slip" will be used here to describe all Kaolin based materials, as well as other commercially available synthetic clays.

In ceramics, it is usual to suspend the Kaolin and the other materials in water to produce what is known as a ceramic slip. The slip material is usually poured into a mold, and then fired to produce a solid article known as a bisque or bisquit.

The amorphous silica used in this invention is usually synthetically produced to insure uniformity. The amorphous form of the silica differentiates it from crystalline forms of silica such as quartz, cristobalite, and tridymite. Synthetic, amorphous silica used in this invention should be analyzed for crystalline forms by X-ray diffraction techniques and, within limits of detection (0.3%), no crystalline forms should be found.

Synthetic amorphous silica is a substance that is inert both chemically and biologically. There is no history of systematic poisoning or silicosis related effects from exposure to amorphous silica. Thus, amorphous silica can be safely used in articles that are subject to frequent human contact.

One manufacturer of amorphous silica is *W. R. Grace and Company* based in Baltimore, Md. The amorphous silica, which is produced under the trademark SYLOID, is used as a flatting agent, an anticaking agent, and for various other purposes.

A preferred method producing the high porosity material of this invention includes the steps of wetting the amorphous silica with a wetting agent, combining the wetted silica with a ceramic slip producing mixture, and removing the majority of the wetting agent to produce a solid, low-density, highly porous bisque. Preferably, the wetting agent should be fairly volatile so that it can be easily removed. When the wetting agent is removed by a rapid evaporative process such as kiln drying, water has been found to be a satisfactory wetting agent.

Preferably, the silica is saturated with the wetting agent to its maximum fluid carrying capacity. This prevents absorption of fluids from the commercial slip mixture and possibly ruining the mixture.

A portion of the surface of the bisque may be treated to reduce its permeability. This treatment can consist of coating a portion of the bisque with a substantially impermeable layer, such as by glazing techniques well known to those skilled in the art.

As a final step, an aromatic fluid is applied to an exposed surface of the bisque for absorbtion into the body of the bisque.

It has been empirically determined that the proper volumetric ratio between the silica and the ceramic slip should be in the range of 1-4 parts silica to each part of slip. Mixtures outside of this range tend to produce a bisque that is either structurally unstable or which possesses inadequate liquid absorption capabilities.

The following are two examples of the present method for producing a highly porous bisque.

EXAMPLE 1

(1) Combine the amorphous silica with a volatile wetting agent until it is fully saturated. Decant any excess wetting agent from the silica.

(2) Combine one part of the wetted silica with one part ceramic slip and mix thoroughly.

(3) Pour the mixture of wetted silica and ceramic slip into a suitable mold.

(4) Let the mixture sit until it has skinned over.

(5) Remove the skinned mixture from the mold.

(6) Air dry the mixture until a dry, hard bisque is formed.

EXAMPLE 2

(1) Pour amorphous silica into a receptacle containing distilled water until all of the water is been absorbed.

(2) Combine four parts of the wetted silica with one part ceramic slip and mix thoroughly.

(3) Pour the resultant mixture into a mold.

(4) Kiln dry the mixture at a temperature greater than 1200° F. until the majority of the water has evaporated from the mixture.

(5) Remove the bisque from the mold.

The ceramic material resulting from the above methods results in a stable, relative inert substance well suited as a scent carrier. The ceramic material can be formed into ornaments, or into larger objects such as ash trays, lamp bases, plates, etc.

Tables one and two below compare the characteristics of the high porosity bisque of the present invention with a conventional bisque produced from ceramic slip alone. Table 1 compares the specific gravity, fluid capacity, and fluid capacity per unit weight of a conventional bisque and a high porosity bisque. All comparisons were made on fired materials having a volume of one cubic centimeter.

The specific gravity (measured in grams/$CM^3$) of a conventional bisque is 1.77 as compared to a 0.82 specific gravity for a high porosity bisque. Thus, the change in specific gravity may be calculated to as 46.33% for the tested samples. It should be noted that the high porosity bisque has a lower specific gravity than water, and thus will float until water is absorbed into its body.

The fluid capacity of a conventional bisque was found to be 0.26 grams/$CM^3$ as compared to 0.62 grams/$CM^3$ for the high porosity bisque. This is an increase of 238.46% for the high porosity bisque.

Even more impressive is the fluid capacity per unit weight. This ratio is found to be 0.147 for a conventional bisque and 0.756 for a high porosity bisque, which is an increase of 514.29%.

As might be expected, the greater fluid carrying capacity of the high porosity bisque allows it to retain and release a fluid over a much longer period of time. Referring to table 2, the fluid retention of a conventional bisque in grams/$CM^3$ was measured to be 0.26 at time 0; 0.16 after one hour; 0.06 after two hours; and negligible after three hours. This compares to a 0.62 retention at time 0 for the high porosity bisque; a 0.52 retention after one hour; and measurable amount of fluid until eight hours later. As noted in the percent change column, the difference in fluid retention between the high porosity bisque and the conventional bisque increases rapidly with time.

TABLE 1

| | CONVENTIONAL BISQUE | HIGH POROSITY BISQUE | % CHANGE |
|---|---|---|---|
| Dry Weight Grams/$CM^3$ | 1.77 | .82 | −46.33% |
| Fluid capacity Grams/$CM^3$ | .26 | .62 | +238.46% |
| Fluid Capacity Per Unit Weight | .147 | .756 | +514.29% |

TABLE 2

| Time (Hours) | Fluid Retention Conventional Bisque Grams/CM$^3$ | Fluid Retention High Porosity | % Change |
| --- | --- | --- | --- |
| 0 | .26 | .62 | +238.46% |
| 1 | .16 | .52 | +325.00% |
| 2 | .06 | .42 | +700.00% |
| 3 | .0 | .32 | — |
| 4 | — | .22 | — |
| 5 | — | .14 | — |
| 6 | — | .09 | — |
| 7 | — | .07 | — |
| 8 | — | .04 | — |
| 9 | — | .0 | — |

While this invention has been described in terms of a few preferred embodiments, it is contemplated that persons reading the preceding descriptions will realize various alterations, permutations and modifications thereof. It is therefore intended that the following appended claims be interpreted as including all such alterations, permutations and modifications as fall within the true spirit and scope of the present invention.

What is claimed is:

1. A method for producing a high porosity ceramic material comprising the steps of:
    (a) wetting a finely divided, non-crystalline, amorphous silica with a wetting agent;
    (b) combining said wetted silica with a ceramic slip to produce a mixture, wherein said wetted silica and said ceramic slip are combined in the proportions of at least one part and at most four parts silica to each part of slip; and
    (c) removing the majority of said wetting agent and other fluids from said mixture to produce a solid, low-density, highly porous bisque.

2. A method as recited in claim 1 wherein said silica is saturated with said wetting agent to its maximum fluid carrying capacity.

3. A method as recited in claim 2 wherein said wetting agent and said other volatile fluids are removed by an evaporative process.

4. A method as recited in claim 3 wherein said mixture is heated above 1200° F. to increase the rate of said evaporative process.

5. A method as recited in claim 1 further comprising the step of reducing the permeability of a portion of the surface of said bisque.

6. A method as recited in claim 5 wherein said step of reducing the permeability of a portion of said surface of said bisque includes applying a coating to a portion of said bisque and drying said coating to form a substantially impermeable layer on said bisque.

7. A method as recited in claim 1 or 5 further comprising the step of applying an aromatic fluid to an exposed surface of said bisque such that said aromatic fluid is absorbed into the body of said bisque.

8. A scented ceramic material comprising a low density, high porosity bisque made from a mixture of 1-4 parts wetted, finely divided, non-crystalline, amorphous silica to 1 part ceramic slip, said bisque being saturated with an aromatic fluid.

9. A scented ceramic material as recited in claim 8 wherein a portion of the surface of said bisque is covered with a substantially impermeable layer.

* * * * *